(12) United States Patent
Zhao et al.

(10) Patent No.: US 12,115,522 B2
(45) Date of Patent: Oct. 15, 2024

(54) IN SITU BIFUNCTIONAL CATALYST FOR DEEP DESULFURIZATION AND INCREASING OCTANE NUMBER OF GASOLINE AND PREPARATION METHOD THEREOF

(71) Applicant: CHINA UNIVERSITY OF PETROLEUM-BEIJING, Beijing (CN)

(72) Inventors: Liang Zhao, Beijing (CN); Jinsen Gao, Beijing (CN); Butian Xia, Beijing (CN); Lixia Dong, Beijing (CN); Jingye Chen, Beijing (CN); Yuhao Zhang, Beijing (CN); Chunming Xu, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 302 days.

(21) Appl. No.: 17/390,123

(22) Filed: Jul. 30, 2021

(65) Prior Publication Data
US 2021/0354118 A1    Nov. 18, 2021

Related U.S. Application Data

(63) Continuation of application No. PCT/CN2019/115265, filed on Nov. 4, 2019.

(30) Foreign Application Priority Data

Feb. 1, 2019  (CN) .......................... 201910105544.7
Aug. 2, 2019  (CN) .......................... 201910711695.7

(51) Int. Cl.
*B01J 29/40*    (2006.01)
*B01J 21/04*    (2006.01)
(Continued)

(52) U.S. Cl.
CPC ............. *B01J 29/405* (2013.01); *B01J 21/04* (2013.01); *B01J 23/10* (2013.01); *B01J 29/40* (2013.01);
(Continued)

(58) Field of Classification Search
CPC . B01J 29/405; B01J 21/04; B01J 23/10; B01J 29/40; B01J 29/70; B01J 35/0006;
(Continued)

(56) References Cited

U.S. PATENT DOCUMENTS 4,392,945 A    7/1983   Howard et al.
4,668,376 A    5/1987   Young et al.
(Continued)

FOREIGN PATENT DOCUMENTS

CA    2890626 A1 *  5/2014   ............ B01J 23/002
CN    101439293 A    5/2009
(Continued)

OTHER PUBLICATIONS

Liang et al, Study on the Catalyst Supported on Molecular Sieve-Alumina Composite for FCC Gasoline Isomerization/Hydrodesulfurization , Journal of Chemical Engineering of Chinese Universities (Year: 2012).*
(Continued)

*Primary Examiner* — Randy Boyer
*Assistant Examiner* — Juan C Valencia
(74) *Attorney, Agent, or Firm* — Pokalsky Wilczynski Brozek, LLP

(57) ABSTRACT

Provided are an in situ bifunctional catalyst for deep desulfurization and increasing octane number of gasoline, and its preparation method and application. The bifunctional catalyst includes a modified catalyst carrier and a loaded active metal, where the modified catalyst carrier is a composite carrier prepared through mixing γ-$Al_2O_3$ and an acidic
(Continued)

molecular sieve by a binder and calcining. When the bifunctional catalyst provided by the present application is used for hydrodesulfurization of gasolines, deep desulfurization, olefin reduction and octane number preservation can be realized simultaneously, thereby obtaining a high-quality oil product.

10 Claims, 4 Drawing Sheets

(51) Int. Cl.
| | |
|---|---|
| *B01J 23/10* | (2006.01) |
| *B01J 29/70* | (2006.01) |
| *B01J 35/00* | (2024.01) |
| *B01J 37/02* | (2006.01) |
| *B01J 37/04* | (2006.01) |
| *B01J 37/08* | (2006.01) |
| *C10G 45/12* | (2006.01) |

(52) U.S. Cl.
CPC ............... *B01J 29/70* (2013.01); *B01J 35/19* (2024.01); *B01J 37/0201* (2013.01); *B01J 37/0207* (2013.01); *B01J 37/04* (2013.01); *B01J 37/082* (2013.01); *C10G 45/12* (2013.01); *B01J 2229/18* (2013.01); *B01J 2229/20* (2013.01); *C10G 2300/104* (2013.01); *C10G 2300/202* (2013.01); *C10G 2300/4006* (2013.01); *C10G 2300/4012* (2013.01); *C10G 2300/4018* (2013.01); *C10G 2300/70* (2013.01); *C10G 2400/02* (2013.01)

(58) Field of Classification Search
CPC .... B01J 37/0201; B01J 37/0207; B01J 37/04; B01J 37/082; B01J 2229/18; B01J 2229/20; B01J 23/883; B01J 35/002; B01J 23/8871; B01J 29/0333; B01J 29/044; C10G 45/12; C10G 2300/104; C10G 2300/202; C10G 2300/4006; C10G 2300/4012; C10G 2300/4018; C10G 2300/70; C10G 2400/02; C10G 45/08
See application file for complete search history.

(56) References Cited

U.S. PATENT DOCUMENTS

| | | | |
|---|---|---|---|
| 6,042,719 A | 3/2000 | Shih | |
| 6,413,898 B1 * | 7/2002 | Faber | B01J 35/04 |
| | | | 502/64 |
| 2012/0048778 A1 * | 3/2012 | Podrebarac | C10G 35/06 |
| | | | 208/210 |

FOREIGN PATENT DOCUMENTS

| | | |
|---|---|---|
| CN | 101844088 | 9/2010 |
| CN | 101885983 A | 11/2010 |
| CN | 101898148 A | 12/2010 |
| CN | 104667956 A * | 6/2015 |
| CN | 106607096 A | 5/2017 |
| CN | 106890660 A | 6/2017 |
| CN | 108421557 A | 8/2018 |
| CN | 108479846 A | 9/2018 |
| CN | 201910711695.7 | 4/2020 |
| CN | 201910712210.6 | 4/2020 |
| EP | 0181254 A1 * | 5/1986 |
| EP | 98 91 1418 A | 3/2000 |
| WO | 97 03150 | 1/1997 |
| WO | 98 38265 A1 | 9/1998 |
| WO | 2011095688 A2 | 8/2011 |
| WO | 2011122446 A1 | 10/2011 |
| WO | PCT/CN2019/115265 | 1/2020 |
| WO | PCT/CN2019/115275 | 1/2020 |
| WO | 2020155720 A1 | 8/2020 |

OTHER PUBLICATIONS

Liang et al., Study on the Catalysts Supported on Molecular Sieve-Aluminum Composite for FCC Gasoline Isomerization/Hydrodesulfurization, Journal of Chemical Engineering of Chinese Universities, No. 5, vol. 26, Oct. 2012 (English abstract provided).
Study on the Selective Hydrosulfurization Catalyst for FCC Gasoline, Dalian University of Technology, 2016 (English abstract provided).
Zhang et al., Research progress of ZSM-5 composite porous material, Inorganic Chemicals Industry, vol. 50, No. 7, Jul. 2018, Wuhan, China (English abstract provided).
Lamour, S., et al., 2017, Control of the γ-alumina to α-alumina phase transformation for an optimized alumina densification, Boletin de la Sociedad Espanola de Ceramica y Vidrio, 56:47-54.
Dec. 19, 2023, Office Action in U.S. Appl. No. 17/390,820, Liang Zhao, first named inventor.
Hydrotreating Process and Engineering, SINOPEC Press, 2004, ISBN 7-80164-665-7, China (English abstract provided).
Zhang et al., Research progress of ZSM-5 composite material, Inorganic Chemicals Industry, vol. 50, No. 7, Jul. 2018 (English abstract provided).
Xiru Cao, Study on Catalyst Preparation and Process for Selective Hydrodesulfurization of FCC Gasoline, Chinese Master's Theses Full-Text Database, Engineering Science & Technology1, Jul. 15, 2016 (English abstract provided).

* cited by examiner

IN SITU BIFUNCTIONAL CATALYST FOR DEEP DESULFURIZATION AND INCREASING OCTANE NUMBER OF GASOLINE AND PREPARATION METHOD THEREOF

CROSS-REFERENCE TO RELATED APPLICATIONS

This application is a continuation of International Application No. PCT/CN2019/115265, filed on Nov. 4, 2019, which claims priority to Chinese Patent Application No. 201910105544.7, filed on Feb. 1, 2019 and Chinese Patent application No. 201910711695.7, filed on Aug. 2, 2019, all of which are hereby incorporated by reference in their entireties.

TECHNICAL FIELD

The present application relates to petrochemical technologies, specifically to an in-situ bifunctional catalyst for deep desulfurization and increasing octane number of gasoline and its preparation method and application, and in particular, to a bifunctional catalyst with hydrodesulfurization activity and isomerization activity and its preparation method and application.

BACKGROUND

In recent years, motor vehicle emissions have caused serious air pollution, for example, frequent occurrence of haze weather is closely related to exhaust emission of motor vehicles. Researches have shown that sulfur content in oil almost determines levels of all pollutants emitted by motor vehicles. In view of this, all countries and regions in the world have formulated increasingly stringent gasoline quality standards. For example, it was stipulated in the National Standard V of China implemented in January 2017 that the sulfur content of gasoline should be reduced to less than 10 ppm, olefins not more than 25 v %, and aromatics not more than 40 v %. In addition to a requirement of sulfur content being below 10 ppm, it was further required in the vehicle gasoline standard in the National Standard VI of China implemented in 2019 that olefin content is below 18 v % and octane number is kept above 92. Therefore, the development trend of clean gasoline in China in the future is mainly as follows: ensuring the sulfur content in gasoline is maintained below 10 ppm, and meanwhile greatly reducing the olefin content and maintaining high octane number.

A main blending component of commercial gasoline in China is Fluid Catalytic Cracking (FCC) gasoline, which accounts for about 75% of the composition of the commercial gasoline, but contributes more than 90% of the sulfur-comprising component and more than 95% of the olefins. In order to meet the more and more stringent gasoline quality standards, FCC gasoline must be treated with deep desulfurization and olefin reduction. The key of hydrodesulfurization technology development is the development of a hydrodesulfurization (HDS) catalyst with high performance.

At present, the most widely used HDS catalyst in hydrodesulfurization process of gasoline is a CoMo based HDS catalyst which has been subject to presulfurization treatment, and usually which uses $\gamma\text{-Al}_2\text{O}_3$ as a carrier and is loaded with Co and Mo active metals. A traditional CoMo based HSD catalyst has the advantages of good thermal stability, low price, etc., but the disadvantage is that it is difficult to achieve deep desulfurization when it is used for desulfurization of feed oil, especially for FCC gasoline, and it will cause saturation of a large number of olefins, which will lead to a large loss of octane number.

In order to solve the above problems, other kinds of hydrodesulfurization catalysts have been developed at present, but most of them only pursue high desulfurization rate, or further reduce the loss rate of aromatics to ensure that the octane number does not decrease significantly, but it is still difficult to meet the strict requirements of maintaining octane number while reducing olefin and desulfurizing FCC gasoline. In order to meet the increasingly stringent gasoline quality standards and produce ultra-low sulfur (sulfur content is no more than 10 ppm) or even sulfur-free clean gasoline products, it is more and more important to develop a new hydrodesulfurization catalyst.

SUMMARY

In view of the above defects, the present application provides a bifunctional catalyst for hydrodesulfurization coupled with isomerization and its preparation method, and the use of the bifunctional catalyst can realize the purposes of deep desulfurization, olefin reduction and octane number preservation.

The present application further provides a hydrodesulfurization method of gasoline, which can realize the purposes of deep desulfurization, olefin reduction and octane number preservation by using the above bifunctional catalyst, and thus it is conducive to obtaining an ultra-low sulfur or even sulfur-free clean gasoline product.

In order to achieve the above purpose, the present application provides a bifunctional catalyst for hydrodesulfurization coupled with isomerization, which includes a modified catalyst carrier and a loaded active metal. The modified catalyst carrier is a composite carrier prepared through mixing $\gamma\text{-Al}_2\text{O}_3$ and an acidic molecular sieve by a binder and calcining.

Compared with a traditional catalyst using $\gamma\text{-Al}_2\text{O}_3$ as a carrier, the bifunctional catalyst provided by the present application adopts the acidic molecular sieve as a doping agent of $\gamma\text{-Al}_2\text{O}_3$. Such catalyst can not only make the bifunctional catalyst have more acid centers, but also adjust the ratio of Brønsted sites (BAS) to Lewis acid sites (LAS) on a surface of the bifunctional catalyst. Through further research, the inventor found that with an increase of the BAS/LAS ratio on the surface of the bifunctional catalyst within a certain range, the hydrodesulfurization efficiency and olefin isomerization conversion of the bifunctional catalyst increased. Therefore, the application of the bifunctional catalyst in the hydrodesulfurization of gasoline, especially in the hydrodesulfurization treatment of FCC gasoline, can not only promote a hydrogenation reaction and improve a desulfurization rate, but also promote an olefin isomerization reaction. Therefore, it is possible to reduce the olefin content and ensure that the octane number is almost not lost or even slightly increased, and finally realize deep desulfurization, olefin reduction and octane number preservation.

The acidic molecular sieve refers to a molecular sieve with acid catalytic function. The acidic molecular sieve used in the present application can be selected from but not limited to the following molecular sieves: one or more of ZSM series of molecular sieves, MCM series of molecular sieves, SAPO series of molecular sieves and beta molecular sieves (β molecular sieves). ZSM series of molecular sieves can be one or more of ZSM-5, ZSM-8, ZSM-11, ZSM-35 molecular sieve, etc.; MCM series of molecular sieves can be one or more of MCM-22, MCM-36, MCM-41 molecular sieve, etc.; SAPO series of molecular sieves can be one or more of SAPO-5, SAPO-11, SAPO-34 molecular sieve, etc. In some embodiments of the present application, acidic molecular sieves with strong B acid center and adjustable pore structure are preferred, such as ZSM-5 molecular sieve, MCM-41 molecular sieve, SAPO-34 molecular sieve, Bata molecular sieve, etc.

In the composite carrier, it is preferable that the mass of $\gamma$-$Al_2O_3$ is greater than or equal to that of the acidic molecular sieve. The applicant found that with an increase of a proportion of the acidic molecular sieve in the composite carrier, more acid centers can be obtained, and thus the bifunctional catalyst can show more excellent isomerization performance. However, active sites of hydrogenation may be decreased due to the decrease in the proportion of $\gamma$-$Al_2O_3$, which in turn leads to a decrease in hydrodesulfurization performance. Therefore, considering the desulfurization performance and isomerization performance comprehensively, the mass ratio of $\gamma$-$Al_2O_3$ to the acidic molecular sieve is generally controlled to 1-9:1, preferably 4-8:1.

The present application does not specifically limit the specific selection of the binder, and conventional binders can be selected. By selecting an appropriate binder, the composite carrier with excellent performance, uniform distribution and moderate acidity can be obtained, which makes the bifunctional catalyst show good isomerization performance. In some embodiments of the present application, the binder used can be one or more of amino trimethylene phosphonic acid (ATMP), polyvinyl pyrrolidone (PVP), sesbania powder, etc.

Reasonable control of an amount of the binder is conducive to improving the desulfurization performance and isomerization performance of the bifunctional catalyst. In a specific implementation process of the present application, the ratio of the binder mass to a sum of masses of $\gamma$-$Al_2O_3$ and the acidic molecular sieve can particularly be controlled in a range of 1.5-3:1. That is to say, the ratio of binder to ($\gamma$-$Al_2O_3$ and acidic molecular sieve)=1.5-3:1.

The active metal loaded on the bifunctional catalyst of the present application can be specifically selected from at least two of VIB Group and VIII Group elements in the Periodic Table of Elements. Where the active metal accounts for 3-30% of a total mass of the bifunctional catalyst based on an oxide.

Further, the above-mentioned active metal can include at least one of the VIB Group elements and at least one of the VIII Group elements. Where, the VIB Group elements can be, for example, Cr, Mo and W; the VIII Group elements can be, for example, Fe, Co, Ni, Ru, Rh, Pd, Os, Ir, Pt.

Reasonable adjustment of the element composition of the active metal is beneficial to further improvement of the hydrodesulfurization effect of the bifunctional catalyst. In the specific implementation process of the present application, a mole ratio of a VIB Group element to a VIII Group element is generally controlled to 1:0.1-0.6, for example, anatomic mole ratio of Mo to Co is 1:0.1-0.6 when Mo and Co are used as active metals.

In a preferred implementation of the present application, Mo and Co are both selected as the active metals. Furthermore, a mass fraction of $MoO_3$ is 5-14%, and a mass fraction of CoO is 1-10%.

The bifunctional catalyst provided by the present application can be obtained by loading the active metal on a modified catalyst carrier via an impregnation method, then aging, drying, and calcining.

The present application further provides a preparation method of the aforementioned bifunctional catalyst for hydrodesulfurization coupled with isomerization, including the following steps:

mixing $\gamma$-$Al_2O_3$ and an acidic molecular sieve by a binder, and calcining to prepare a modified catalyst carrier, loading an impregnation solution containing an active metal onto the modified catalyst carrier using an impregnation method, then aging, drying and calcining, to obtain the bifunctional catalyst.

Specifically, mixing $\gamma$-$Al_2O_3$ with the acidic molecular sieve by the binder, then washing, drying, and calcining at 450-700° C. for 6-12 h to obtain the modified catalyst carrier. For example, mixing $\gamma$-$Al_2O_3$ with the acidic molecular sieve in a proportion and being grounded to a certain mesh, and then adding an appropriate amount of binder and mixing evenly. In addition, adding a small amount of nitric acid, and then performing washing by vacuum filtration, drying and calcining in a calcination furnace to obtain the modified catalyst carrier.

Where the nitric acid added in the process of preparing the modified catalyst carrier is used for pore formation during to reduce an external diffusion resistance. In order to avoid a large change of ratio of Si/Al caused by nitric acid and ensure pore formation during calcination, the amount of nitric acid is small, and is generally about 1-5% of a mass of $Al_2O_3$, such as about 3 wt % (weight percent).

Furthermore, the process of preparing the bifunctional catalyst further includes a step of preparing an impregnation solution:

Mixing a compound containing the active metal, an organic complexing agent and water to obtain the impregnation solution;

where a molecular structure of the organic complexing agent includes at least two carboxyl groups, and the organic complexing agent is soluble in water.

Specifically, the above-mentioned compound containing the active metal can be a metal salt corresponding to the active metal, such as carbonate, nitrate, etc. For example, if Co and Mo are both selected as active metals, a Co source can be basic cobalt carbonate, cobalt nitrate, etc., and a Mo source can be, for example, ammonium heptamolybdate. The atomic molar ratio of Mo to Co can be 1:0.1-0.6. In a specific implementation process of the present application, the mass fraction of $MoO_3$ in the impregnation solution is generally 8-14%, and the mass fraction of CoO in the impregnation solution is generally 1-6%, based on an oxide in a metal active component.

Specifically, the organic complexing agent is used to improve the dispersion of the metal active component in the composite carrier, so as to reduce an interaction between the metal active component and the composite carrier, thereby improving sulfurization degree and desulfurization effect of the bifunctional catalyst. The organic complexing agent that meets the above requirements can be, for example, at least one of citric acid (CA), tartaric acid (TA), nitrilotriacetic acid and amino sulfonic acid.

In some examples of the present application, when preparing the impregnation solution, the mass ratio of the organic complexing agent to water is generally controlled to 1:1-3. When Co and Mo are both selected as the active metal components, the molar ratio of the organic complexing agent to metal molybdenum is 0.5-2:1.

A preparation temperature of the impregnation solution is generally 40-100° C., such as 60-100° C. Specifically, components in the impregnation solution can be evenly mixed by stirring, for example, stirring at 40-100° C. for 1-2 h. Of course, if a small amount of metal salt is not completely dissolved, a small amount of ammonia can be added to promote the dissolution of the metal salt.

After the preparation of the impregnation solution is completed, the impregnation solution can be loaded onto the composite carrier by an isometric impregnation method, and then aged at room temperature for 6-12 h, dried at 100-120° C. for 6-12 h, and calcined at 450-600° C. for 4-8 h. In a specific implementation process of the present application, the calcination can adopt a programmed heating method, for example, first keeping at 200° C. for about 50 minutes, then keeping at 300° C. for about 30 minutes, and finally calcining at 500° C. for about 4 h. A calcination atmosphere can be one of nitrogen, argon and helium.

The bifunctional catalyst of the present application can be extruded into a shape that meets an application environment, for example, can be prepared into clover shaped, cylindrical, or spherical particles, etc.

The present application also provides a hydrodesulfurization method of gasoline, which adopts the above-mentioned bifunctional catalyst.

Specifically, pre-sulfurization on the bifunctional catalyst first and then hydrodesulfurization treatment on the gasoline are performed. The gasoline can be a full fraction gasoline or a heavy fraction gasoline.

Where the pre-sulfurization reaction conditions can be as follows: temperature 300-500° C., hydrogen partial pressure 1.5-2.5 MPa, hydrogen-oil volume ratio (namely, the volume ratio of hydrogen to oil, H/O for short) 200-350, and pre-sulfurization time 8-12 h.

The bifunctional catalyst of the present application can adopt a fixed bed process during hydrodesulfurization, select a bifunctional catalyst with appropriate shape and structure, and adopt a fixed bed for packing.

Through further research, optimal process conditions for hydrodesulfurization of gasoline using the bifunctional catalyst are as follows: temperature 250-300° C., pressure 1.5-3.0 MPa (i.e., hydrogen partial pressure 1.5-3.0 MPa), volume space velocity 3-8 $h^{-1}$, and hydrogen-oil volume ratio 150-350. By performing hydrodesulfurization under the above process conditions, hydrodesulfurization, olefin reduction and octane number preservation can be better realized.

In conclusion, the present application provides an in-situ bifunctional catalyst for deep desulfurization and improvement of octane number of gasoline, and its preparation method and application, and has the following beneficial effects:

by using an acidic molecular sieve as the doping agent of the $\gamma$-$Al_2O_3$, the bifunctional catalyst for hydrodesulfurization coupled with isomerization provided by the present application not only makes the bifunctional catalyst have more acid centers, but also can adjust the BAS/LAS ratio of the surface of the bifunctional catalyst, so that the desulfurization rate can reach about 90% or higher, and 30% or more of olefins can be saturated. In addition, the octane number loss is within 0.1 unit or even slightly increased, thus realizing deep desulfurization, olefin reduction and octane number preservation.

Moreover, the bifunctional catalyst can realize deep desulfurization, olefin reduction and octane number preservation of full or heavy fraction gasoline under a mild condition. Therefore, it is very suitable for the production of an ultra-low sulfur or even sulfur-free clean gasoline, so that the resulting gasoline can meet the increasingly strict gasoline quality standard.

The preparation method of the bifunctional catalyst for hydrodesulfurization coupled with isomerization provided by the present application has simple preparation steps, which is very suitable for actual industrialized production and popularization.

As for the hydrodesulfurization method of gasoline provided by the present application, due to the above bifunctional catalyst, deep desulfurization, olefin reduction and octane number preservation of full or heavy fraction gasoline are realized, thereby being favor of obtaining high-quality gasoline products.

DESCRIPTION OF EMBODIMENTS

Figure 1:
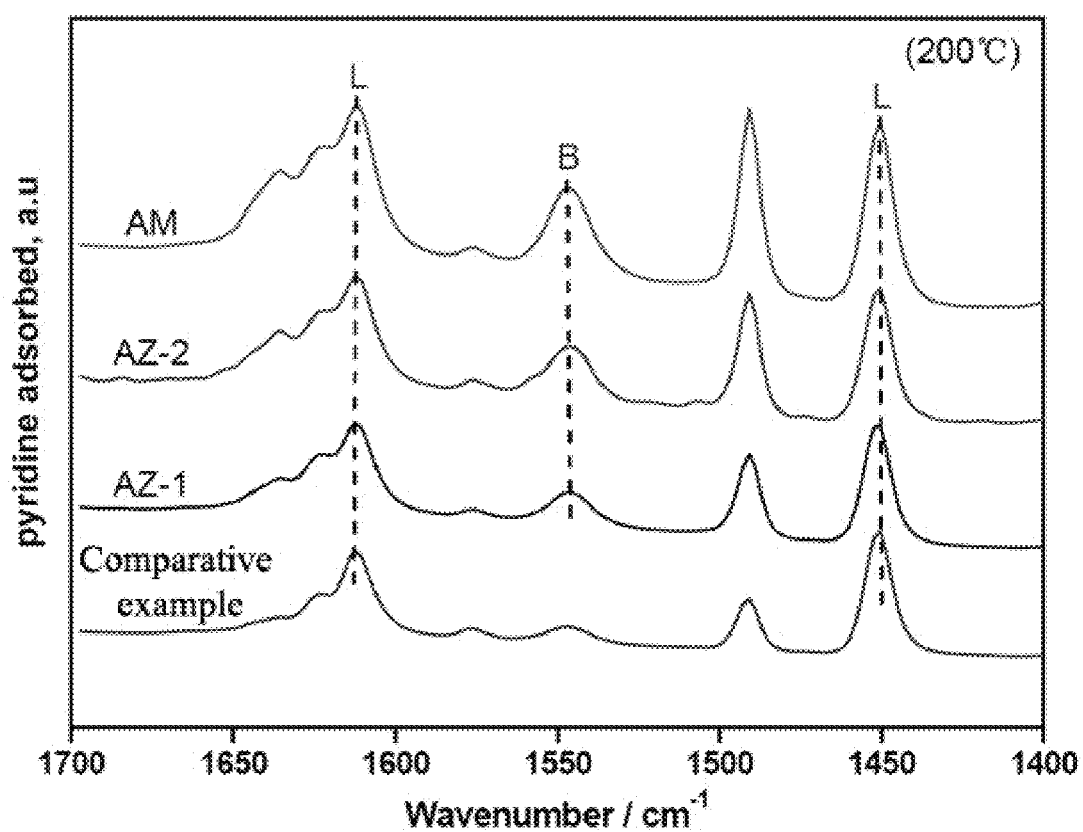
FIG. 1 is a Py-FTIR diagram of the total acid amount of catalysts provided by Examples 1-3 and Comparative example of the present application.

In order to make the purposes, technical solutions and advantages of the embodiments of the present application clearer, the technical solutions in the embodiments of the present application will be described clearly and completely with reference to drawings in the embodiments of the present application. Obviously, the described embodiments are part of embodiments of the present application, but not all embodiments. Based on the embodiments in the present application, all other embodiments obtained by skilled in the art without creative work belong to the protection scope of the present application.

Example 1

The present example provides the preparation method of a bifunctional catalyst for hydrodesulfurization coupled with isomerization, including the following steps:

1. Weighing 16 g of $\gamma$-$Al_2O_3$, and then mixing $\gamma$-$Al_2O_3$ and ZSM-5 in a mass ratio of 7.8:1, adding 28.6 g of sesbania powders and 12 ml dilute nitric acid (3%), drying at 120° C. for about 8 h and calcining at 500° C. for 4 h, to obtain the $\gamma$-$Al_2O_3$/ZSM-5 as a composite carrier.

2. Taking an appropriate amount of water, stirring and heating to 40° C., adding citric acid (CA), and stirring until completely dissolved; then adding 2.5 g of cobalt carbonate (CA/Co=1.5) and stirring until no bubble is generated; slowly heating the solution to a boiling state so as to dissolve all materials (no bubble is generated), stopping heating, and stopping stirring when the temperature is reduced to room temperature; adding ammonia to 85% of a final volume, then adding slowly 6.2 g of ammonium heptamolybdate, stirring until completely dissolved, supplementing ammonia to the final volume, sealing and storing, ready for use.

3. Loading an impregnation solution prepared in step 2 onto the AZ composite carrier prepared in step 1 by anisometric impregnation method, and then stirring for 10 min after saturation, ageing at room temperature for 8 h, drying at 120° C. for 6 h, and performing temperature programmed calcination: firstly calcining at 200° C. for 50 min, then calcining at 300° C. for 30 min, and finally calcining at 500° C. for 4 h to obtain the bifunctional catalyst, recorded as AZ-1, a specific composition of the bifunctional catalyst AZ-1 is shown in Table 1.

COMPARATIVE EXAMPLE

The present Comparative example provides a traditional CoMo/γ-Al$_2$O$_3$ catalyst, its preparation method is as follows: no treatment is done for γ-Al$_2$O$_3$, a preparation process of the impregnation solution and the isometric impregnation method are the same as those in steps 2-3 of Example 1, respectively. The composition of CoMo/γ-Al$_2$O$_3$ catalyst is shown in Table 1.

Example 2

The present example provides a preparation method of a bifunctional catalyst for hydrodesulfurization coupled with isomerization, and the process steps are basically the same as those in Example 1, except that: the mass ratio of γ-Al$_2$O$_3$ to ZSM-5 is about 4.1:1, and the obtained bifunctional catalyst is named as AZ-2, and its specific composition is shown in Table 1.

Example 3

The present example provides a preparation method of a bifunctional catalyst for hydrodesulfurization coupled with isomerization, and the process steps are basically the same as those in Example 1, except that: ZSM-5 molecular sieve used in Example 1 is replaced by MCM-41 molecular sieve, the mass ratio of γ-Al$_2$O$_3$ to ZSM-5 is about 7.9:1, and the obtained bifunctional catalyst is named as AM, and its specific composition is shown in Table 1.

Figure 2:
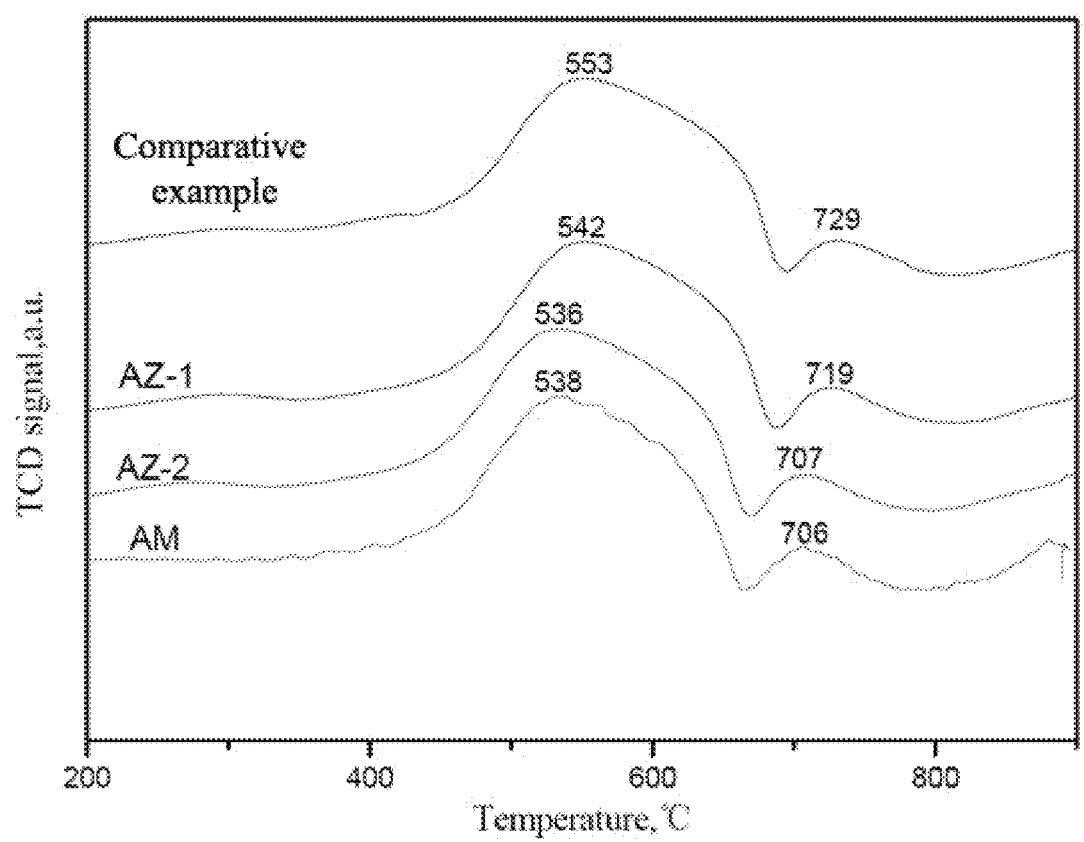
FIG. 2 is a $H_2$-TPR diagram of catalysts prepared by Examples 1-3 and Comparative example of the present application.

A pyridine adsorption infrared spectrum (Py-FTIR) diagram of total acid amounts of catalysts provided by Examples 1-3 and the Comparative example is shown in FIG. 1, and a H$_2$-TPR diagram is shown in FIG. 2.

The desulfurization effect and olefin isomerization of the catalysts provided by Examples 1-3 and Comparative example were evaluated, specifically as follows:

3.2 g of catalyst was taken and put into a temperature constant zone of a fixed bed reactor with an inner diameter of 8 mm and the quartz sand is filled above and below the catalyst. The catalyst was pre-sulfurized by 3 wt % of CS$_2$ solution as a pre-sulfurization solution. The reaction conditions of pre-sulfurization were as follows: temperature 300° C., pressure 2.5 MPa, H/0=300, volume space velocity 3 h$^{-1}$, time of pre-sulfurization 6$h$.

Figure 3:
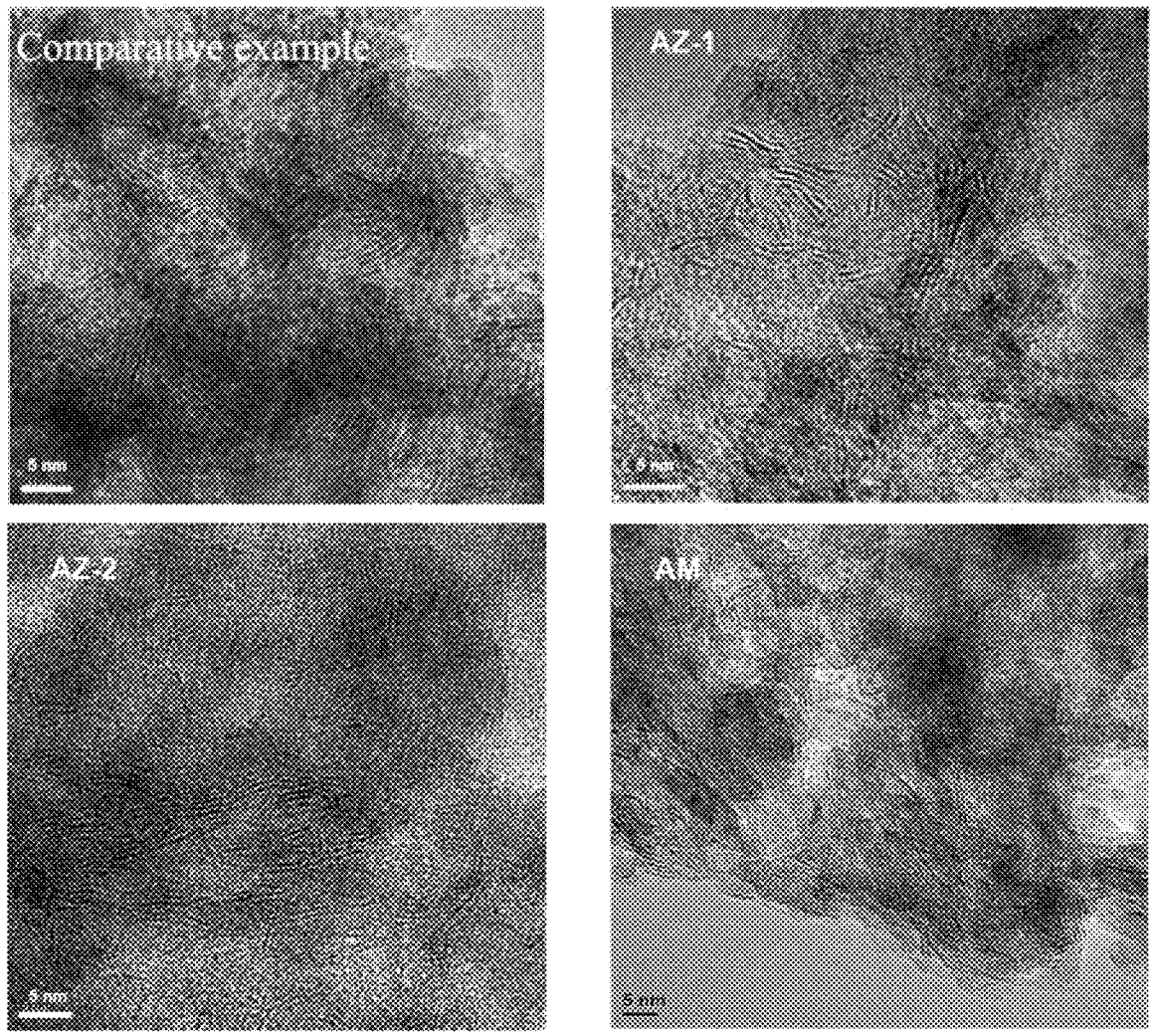
FIG. 3 is a HRTEM diagram of the sulfurized state of catalysts prepared by Examples 1-3 and Comparative example of the present application after hydrodesulfurization reaction.

After the pre-sulfurization reaction was completed, the hydrogenation reaction performance of each catalyst was tested using model oil (olefin content is 19.3 wt %, thiophene sulfur content is 996 ppm, solvent is N-heptane) and North China heavy fraction gasoline (above 100° C., sulfur content is 1,078 ppm, composition of group is shown in Table 2) as raw materials. The process conditions of the hydrogenation reaction were as follows: temperature 270° C., pressure 2 MPa, H/0=300, volume space velocity 3.5 h$^{-1}$. The hydrogenation reaction results of the model oil and the North China heavy fraction gasoline by each catalyst were shown in Table 3-1 and Table 3-2 respectively. The catalyst samples after reaction were taken for characterizing and testing. The obtained HRTEM results were shown in FIG. 3.

In the Py-FTIR diagram, the characteristic peaks near 1450 and 1622 cm$^{-1}$ are the characteristic absorption peaks of Lewis acid (L acid for short). It can be seen from FIG. 1 that, compared with the traditional CoMo/γ-Al$_2$O$_3$ catalyst provided by the Comparative example, the bifunctional catalysts provided by Examples 1-3 have more acid centers and higher B/L value, thus giving the bifunctional catalysts more excellent acid catalytic activity. In the hydrotreating process of FCC gasoline, it is more conducive to promoting hydrocarbon isomerization reaction, which can also be directly confirmed from Table 3-1 and Table 3-2.

Moreover, compared with the bifunctional catalysts in Example 1 and Example 2, AZ-2 has stronger acidic center and better isomerization performance. However, since the decrease in the proportion of γ-Al$_2$O$_3$ in the composite carrier will lead to a large reduction on hydrogenation active sites, the hydrodesulfurization performance of AZ-2 is lower than that of AZ-1, which can also be confirmed from Table 3-1 and Table 3-2.

According to the H$_2$-TPR results of catalyst in oxidized state (FIG. 2), compared to the conventional CoMo/γ-Al$_2$O$_3$ catalyst provided by the Comparative example, low temperature characteristic peaks (Mo$^{6+}$→H$_x$MoO$_3$→Mo$^{4+}$) of Mo species of the bifunctional catalyst provided by Examples 1-3 are decreased from 553° C. to 542° C. (AZ-1), 536° C. (AZ-2) and 538° C. (AM), respectively. This indicates that Mo species in high valence state of the bifunctional catalyst is more readily reduced to a sulfurized product MoS$_2$ having a higher degree of sulfurization, which is beneficial for the hydrodesulfurization reaction.

According to the results of a high resolution transmission electron microscope (HRTEM) (FIG. 3, a scale in the drawing is 5 nm), an average length L of MoS$_2$ active phase of the conventional CoMo/γ-Al$_2$O$_3$ catalyst is 2.9 nm and the average number N of stacking layers is 2.04. While, an average length $\overline{L}$ of MoS$_2$ active phase of the bifunctional catalyst provided by Example 1 is 3.6 nm, and the average number N of stacking layers is 2.87; an average length $\overline{L}$ of MoS$_2$ active phase of the bifunctional catalyst provided by Example 2 is 3.34 nm, and the average number $\overline{N}$ of stacking layers is 2.11; an average length $\overline{L}$ of MoS$_2$ active phase of the bifunctional catalyst provided by Example 3 is 3.15 nm, and the average number $\overline{N}$ of stacking layers is 2.41. The average length $\overline{L}$ and average number of stacking number $\overline{N}$ of MoS$_2$ active phases of AZ and AM bifunctional catalysts are higher than those of the corresponding catalyst of Comparative example. This indicates that an interaction between the composite carrier and the active metal of the bifunctional catalysts is weak and more MoS$_2$ active phases are formed, so the bifunctional catalyst has stronger hydrodesulfurization effect than Comparative example.

Moreover, AM bifunctional catalyst has more B acid centers than AZ-1 and AZ-2 bifunctional catalysts, and thus shows the strongest isomerization performance. However, too many acidic sites have occupied original hydrogenation active sites, resulting in the hydrodesulfurization activity of AM bifunctional catalyst decreased compared with AZ-1 and AZ-2 bifunctional catalysts, which can also be confirmed from Table 3-1 and Table 3-2.

TABLE 1

Composition of catalysts (wt %)

|  | γ-Al$_2$O$_3$ | ZSM-5 | MCM-41 | CoO | MoO$_3$ |
|---|---|---|---|---|---|
| Comparative example | 77.4 | — | — | 3.3 | 13.2 |
| Example 1(AZ-1) | 68.9 | 8.8 | — | 3.4 | 13.3 |
| Example 2(AZ-2) | 62.4 | 15.3 | — | 3.3 | 13.1 |
| Example 3(AM) | 68.1 | — | 8.6 | 3.5 | 13.3 |

Note:
"—" stands for not present; the composition of the catalyst also includes unavoidable impurities introduced by the industrial grade raw material γ-Al$_2$O$_3$ used.

TABLE 2

Composition of North China heavy fraction gasoline group

| Carbon number | N-alkane (wt %) | Isoalkane (wt %) | Olefin (wt %) | Cyclo-alkane (wt %) | Aromatic hydrocarbon (wt %) | Total (wt %) |
|---|---|---|---|---|---|---|
| 7 | 0.60 | 1.04 | 6.27 | 1.79 | 7.38 | 17.08 |
| 8 | 1.83 | 11.38 | 11.49 | 3.68 | 22.12 | 50.51 |
| 9 | 1.04 | 8.34 | 5.12 | 1.93 | 8.93 | 25.36 |
| 10 | 0.33 | 3.47 | 0.83 | 0.29 | 0.67 | 5.58 |
| 11 | 0.18 | 0.68 | 0.19 | 0.01 | 0.00 | 1.05 |
| Total | 3.98 | 24.91 | 23.80 | 7.70 | 43.10 | 100.0 |

TABLE 3-1

Hydrogenation reaction performance of different catalysts for model oil

|  | Sulfur content (ppm) | Desulfurization rate (%) | Olefin content (wt %) | N-alkane content (wt %) | Isoalkane content (wt %) |
|---|---|---|---|---|---|
| Model oil | 996 | — | 19.3 | — | — |
| Comparative example | 132 | 86.7 | 8.2 | 11.2 | 1.3 |
| AZ-1 | 20 | 98.0 | 11.3 | 8.0 | 4.6 |
| AZ-2 | 56 | 94.4 | 12.6 | 6.7 | 6.5 |
| AM | 78 | 92.2 | 13.2 | 6.1 | 7.1 |

TABLE 3-2

Hydrogenation reaction performance of different catalysts for North China heavy fraction gasoline

|  | Sulfur content (ppm) | Desulfurization rate (%) | Olefin content (wt %) | Isoalkane content (wt %) | Octane number |
|---|---|---|---|---|---|
| North China heavy fraction gasoline | 1,078 | — | 23.8 | 24.9 | 84.2 |
| Comparative example | 269 | 75.1 | 9.6 | 25.2 | 81.5 |
| AZ-1 | 41 | 96.2 | 12.3 | 27.1 | 84.1 |
| AZ-2 | 96 | 91.2 | 15.6 | 29.3 | 84.7 |
| AM | 112 | 89.6 | 13.8 | 30.7 | 85.2 |

It can be seen from Table 3-1 that, the bifunctional catalyst provided by Examples 1-3 of the present application has excellent hydrodesulfurization and isomerization performance for the mixed model oil of thiophene and olefin, with the desulfurization rate of more than 90%, even as high as 98%. Moreover, from the composition distribution of the product oil, the bifunctional catalysts provided by Examples 1-3 can significantly inhibit the olefin hydrogenation saturation reaction and greatly promote the olefin isomerization reaction. Therefore, the bifunctional catalysts provided by Examples 1-3 are significantly superior to Comparative example in hydrodesulfurization performance and olefin isomerization performance.

It can be seen from Table 2 and Table 3-2 that, the bifunctional catalyst provided by Examples 1-3 of the present application has excellent desulfurization and olefin reduction performance for North China heavy fraction gasoline, and meanwhile can ensure no loss or even slight increase of octane number. From the composition of the product oil, the bifunctional catalysts in Examples 1-3 have better desulfurization effect than the traditional catalyst in the Comparative example, where:

For Example 1, the desulfurization rate of AZ-1 bifunctional catalyst is as high as 96.2%, and the sulfur content in North China heavy fraction gasoline can be reduced to about 40 ppm after one desulfurization reaction. Moreover, a large number of branched alkanes are generated due to isomerization reaction. For the isomerization reaction of olefins, the higher the degree of branching, the greater the contribution to octane number. Therefore, the loss of octane number during hydrogenation is effectively alleviated, and the octane number of oil is protected. Specifically, for AZ-1, the loss of octane number after hydrogenation of gasoline is only 0.1 unit.

For Example 2, since the content of ZSM-5 molecular sieve was higher than that of Example 1, acidity of the composite carrier was further enhanced, and thus AZ-2 showed stronger isomerization effect than AZ-1. This is mainly reflected in two aspects: on the one hand, from the product distribution, a product oil for AZ-2 contains more isoalkanes; on the other hand, the octane number of the product oil for AZ-2 is 84.7, which is higher than that of AZ-1 (84.1), even 0.5 units higher than that of the raw material oil, This indicates that the outstanding isomerization activity of AZ-2 can ensure that the octane number of FCC gasoline does not reduce but increase during the hydrogenation reaction, which is more obvious for the AM bifunctional catalyst in Example 3.

After hydrogenation reaction by the AM bifunctional catalyst in Example 3, the octane number of the product oil increased by 1.0 units. However, the hydrodesulfurization activity of AM bifunctional catalyst is lower than that of AZ-1 and AZ-2 since too many acid centers on the surface of AM bifunctional catalyst replace the original hydrogenation active centers.

In view of the above, the bifunctional catalyst provided by the present application can be used to solve the problems of deep desulfurization, olefin reduction and octane number preservation in a process of quality upgrading of FCC gasoline.

Figure 4:
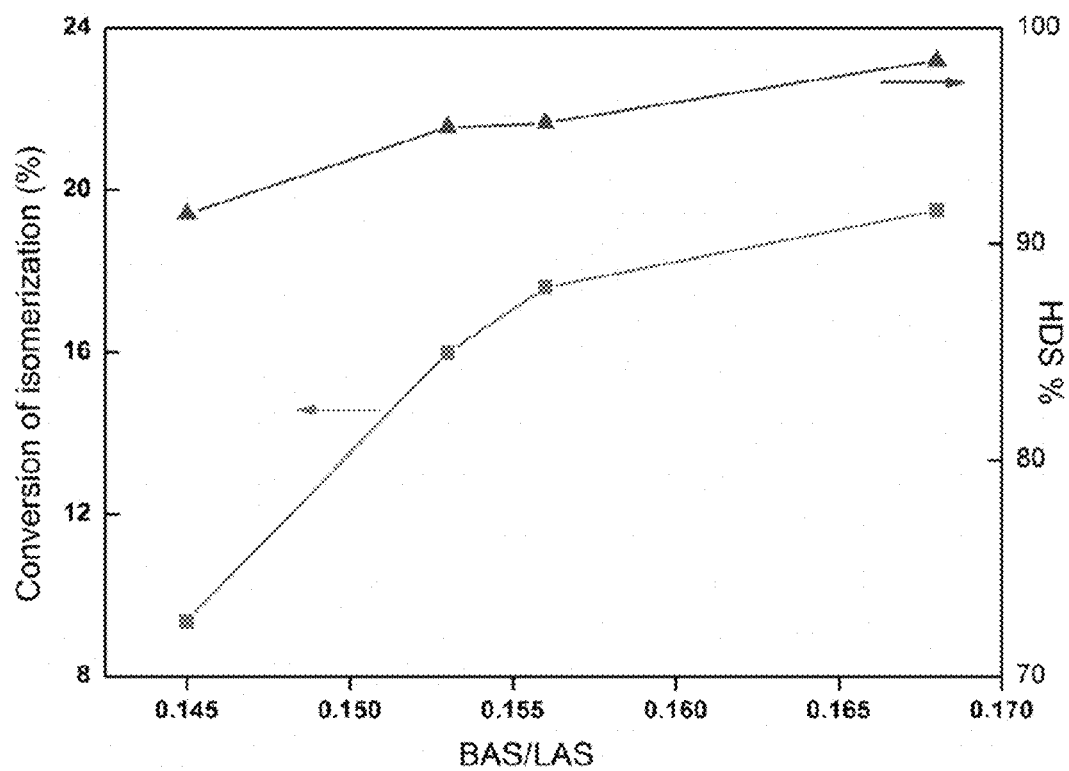
FIG. 4 is a variation diagram of hydrodesulfurization rate and olefin isomerization conversion rate as a function of BAS/LAS ratio.

Based on the performance study of the bifunctional catalysts obtained in the previous examples, the variation rules of hydrodesulfurization (HDS) rate (%) and conversion of isomerization (%) of olefin as a function of BAS/LAS ratio are summarized, roughly shown in FIG. 4. Specifically, within a certain range, with the increase of ratio of BAS/LAS of the surface of the bifunctional catalyst, the hydrodesulfurization rate and the conversion of isomerization showed an upward trend. This indicates that the increase of B acid centers on the surface of γ-Al$_2$O$_3$ and the decrease of L acid centers at the same time are conducive to the hydrogenation reaction and isomerization of gasoline, thus realizing deep desulfurization, olefin reduction and octane number preservation of gasoline, and finally obtaining high-quality gasoline products.

Finally, it should be noted that the above embodiments are only used to illustrate the technical solutions of the present application, not to limit it; although the present application has been described in detail with reference to the foregoing embodiments, those skilled in the art should understand that they can still modify the technical solutions recorded in the foregoing embodiments, or equivalently replace some or all of the technical features therein; these modifications or substitutions do not make the essence of the corresponding technical solution depart from the scope of the technical solutions of the embodiments of the present application.

What is claimed is:

1. A bifunctional catalyst for hydrodesulfurization coupled with isomerization, comprising a modified catalyst carrier and a loaded active metal, wherein the modified catalyst carrier is a composite carrier prepared by mixing $\gamma$-$Al_2O_3$ and an acidic molecular sieve by a binder and calcining; and a mass ratio of $\gamma$-$Al_2O_3$ to the acidic molecular sieve is (4-8):1;
the binder is amino trimethylene phosphonic acid (ATMP) or polyvinylpyrrolidone (PVP) and a mass ratio of the binder to a sum of the $\gamma$-$Al_2O_3$ and the acid molecular sieve is (1.5-3):1;
the bifunctional catalyst for hydrodesulfurization coupled with isomerization is prepared by an impregnation method, the active metal is selected from two or more of VIB Group and VIII Group elements in the Periodic Table of Elements, an organic complexing agent in an impregnation solution is amino sulfonic acid and a molar ratio of the organic complexing agent to the VIII Group element is (0.5-2):1.

2. The bifunctional catalyst according to claim 1, wherein the acidic molecule sieve is selected from one or more of ZSM-5, MCM-41, SAPO-34 and Beta molecular sieve.

3. The bifunctional catalyst according to claim 1, wherein the catalyst for hydrodesulfurization is obtained by loading an active metal onto the modified catalyst carrier, then aging, drying, and calcining.

4. A preparation method of the bifunctional catalyst for hydrodesulfurization coupled with isomerization according to claim 1, comprising:
mixing $\gamma$-$Al_2O_3$ and an acidic molecular sieve by a binder and calcining, to prepare a modified catalyst carrier, wherein the binder is amino trimethylene phosphonic acid (ATMP) or polyvinylpyrrolidone (PVP), and a mass ratio of the binder to a sum of the $\gamma$-$Al_2O_3$ and the acid molecular sieve is (1.5-3):1; and
loading an impregnation solution containing an active metal onto the modified catalyst carrier by an impregnation method, then aging, drying, calcining, to obtain the bifunctional catalyst, wherein the active metal is selected from two or more of VIB Group and VIII Group elements in the Periodic Table of Elements, an organic complexing agent in an impregnation solution is amino sulfonic acid and a molar ratio of the organic complexing agent to the VIII Group element is (0.5-2):1.

5. The preparation method according to claim 4, further comprising a step of preparing the impregnation solution:
mixing a compound containing the active metal, an organic complexing agent and water to obtain the impregnation solution;
wherein the organic complexing agent includes at least two carboxyl groups in its molecular structure, and the organic complexing agent is soluble in water.

6. The preparation method according to claim 4, wherein after the impregnation solution containing the active metal is loaded onto the modified catalyst carrier, aging at room temperature for 6-12h, drying at 100-120° C. for 6-12h, and calcining at 450-600° C. for 4-8h to obtain the bifunctional catalyst wherein a calcination atmosphere is argon or helium.

7. A hydrodesulfurization method of gasoline, comprising performing pre-sulfurization on a bifunctional catalyst first and then hydrodesulfurization treatment on a gasoline, wherein a bifunctional catalyst is adopted for hydrodesulfurization coupled with isomerization, the bifunctional catalyst comprises a modified catalyst carrier and a loaded active metal, the modified catalyst carrier is a composite carrier prepared by mixing $\gamma$-$Al_2O_3$ and an acidic molecular sieve by a binder and calcining, and a mass ratio of $\gamma$-$Al_2O_3$ to the acidic molecular sieve is (4-8):1;
the binder is amino trimethylene phosphonic acid (ATMP) or polyvinylpyrrolidone (PVP and a mass ratio of the binder to a sum of the $\gamma$-$Al_2O_3$ and the acid molecular sieve is (1.5-3):1;
the bifunctional catalyst for hydrodesulfurization coupled with isomerization is prepared by an impregnation method, the active metal is selected from two or more of VIB Group and VIII Group elements in the Periodic Table of Elements, an organic complexing agent in an impregnation solution is amino sulfonic acid and a molar ratio of the organic complexing agent to the VIII Group element is (0.5-2):1.

8. The hydrodesulfurization method according to claim 7, wherein the acidic molecule sieve is selected from one or more of ZSM-5, MCM-41, SAPO-34 and Beta molecular sieve.

9. The hydrodesulfurization method according to claim 7, wherein the catalyst for hydrodesulfurization is obtained by loading an active metal onto the modified catalyst carrier, then aging, drying, and calcining.

10. The hydrodesulfurization method according to claim 7, wherein during an operation, a temperature is controlled to 250-300° C., a pressure is 1.5-3.0 MPa, a volume space velocity is 3-8 $h^{-1}$, and a volume ratio of hydrogen to oil is 150-350.

* * * * *